(12) United States Patent
Conner et al.

(10) Patent No.: US 9,357,039 B2
(45) Date of Patent: *May 31, 2016

(54) HEADER ELIMINATION FOR REAL TIME INTERNET APPLICATIONS

(71) Applicant: Alcatel Lucent, Boulogne-Billancourt (FR)

(72) Inventors: Keith Faulk Conner, Boonton, NJ (US); Anil M. Rao, Cedar Knolls, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/697,872

(22) Filed: Apr. 28, 2015

(65) Prior Publication Data

US 2015/0244843 A1  Aug. 27, 2015

Related U.S. Application Data

(63) Continuation of application No. 11/212,113, filed on Aug. 26, 2005, now Pat. No. 9,031,071.

(51) Int. Cl.
| | | |
|---|---|---|
| *H04L 12/701* | (2013.01) | |
| *H04L 12/801* | (2013.01) | |
| *H04L 12/06* | (2006.01) | |
| *H04L 29/06* | (2006.01) | |
| *H04L 12/841* | (2013.01) | |

(Continued)

(52) U.S. Cl.
CPC .............. *H04L 69/22* (2013.01); *H04L 43/106* (2013.01); *H04L 47/10* (2013.01); *H04L 47/283* (2013.01); *H04L 49/90* (2013.01); *H04L 65/608* (2013.01); *H04L 67/2823* (2013.01); *H04L 67/2828* (2013.01); *H04L 69/04* (2013.01); *H04L 69/167* (2013.01); *H04W 28/06* (2013.01); *H04W 80/04* (2013.01)

(58) Field of Classification Search
CPC ....... H04L 45/00; H04L 47/10; H04L 29/0653
USPC .................................................. 370/389, 392
See application file for complete search history.

(56) References Cited

U.S. PATENT DOCUMENTS

| | | | |
|---|---|---|---|
| 6,680,955 B1 * | 1/2004 | Le ........................... | H04L 29/06 370/477 |
| 6,788,675 B1 | 9/2004 | Yang | |

(Continued)

FOREIGN PATENT DOCUMENTS

| | | |
|---|---|---|
| EP | 1056259 A1 | 11/2000 |
| EP | 1507352 A1 | 2/2005 |

(Continued)

OTHER PUBLICATIONS

J. Postel, RF 768 (rfc768)., . . . User Datagram Protocol, Aug. 28, 1980, pp. 1-3.

(Continued)

*Primary Examiner* — Ronald B Abelson
(74) *Attorney, Agent, or Firm* — Harness, Dickey & Pierce, P.L.C.

(57) ABSTRACT

The disclosed techniques provide for eliminating real-time transport protocol, RTP, extension bit X, marker bit M, time stamp and sequence number information and/or user data protocol, UDP, checksum information from the header of a packet for transmission.

16 Claims, 7 Drawing Sheets

(51) Int. Cl.
  *H04L 12/861*    (2013.01)
  *H04W 28/06*     (2009.01)
  *H04L 29/08*     (2006.01)
  *H04L 12/26*     (2006.01)
  *H04W 80/04*     (2009.01)

(56) References Cited

U.S. PATENT DOCUMENTS

| | | | |
|---|---|---|---|
| 7,124,349 | B2 | 10/2006 | Barrett et al. |
| 7,133,943 | B2 | 11/2006 | Carnevale et al. |
| 7,298,717 | B2 | 11/2007 | Hui et al. |
| 7,359,372 | B2 | 4/2008 | Pelletier et al. |
| 7,697,447 | B2 | 4/2010 | Harris |
| 2001/0030963 | A1 | 10/2001 | Yoshimura et al. |
| 2001/0030965 | A1 | 10/2001 | Tourunen et al. |
| 2002/0089998 | A1 | 7/2002 | Le |
| 2002/0150092 | A1 | 10/2002 | Bontempi et al. |
| 2003/0039270 | A1* | 2/2003 | Chang ............ H04L 1/1671 370/469 |
| 2003/0079230 | A1* | 4/2003 | Woodward, Jr. ...... H04L 47/10 725/90 |
| 2004/0022262 | A1 | 2/2004 | Vinnakota et al. |
| 2004/0088642 | A1 | 5/2004 | Imura et al. |
| 2004/0095939 | A1 | 5/2004 | Yang |
| 2004/0179689 | A1 | 9/2004 | Maggenti et al. |
| 2004/0264433 | A1 | 12/2004 | Melpignano |
| 2005/0052330 | A1 | 3/2005 | Mehltretter |
| 2005/0053066 | A1 | 3/2005 | Famolari |
| 2005/0157696 | A1 | 7/2005 | Yamamoto |
| 2005/0193309 | A1 | 9/2005 | Grilli et al. |
| 2006/0002416 | A1 | 1/2006 | Yagihashi |
| 2006/0120352 | A1 | 6/2006 | Agashe et al. |
| 2007/0047547 | A1 | 3/2007 | Conner et al. |
| 2007/0047551 | A1 | 3/2007 | Conner et al. |
| 2008/0025312 | A1 | 1/2008 | Kuppuswamy et al. |

FOREIGN PATENT DOCUMENTS

| | | |
|---|---|---|
| WO | WO-00/79762 A1 | 12/2000 |
| WO | WO-01/67709 A2 | 9/2001 |
| WO | WO-02/45357 A2 | 6/2002 |

OTHER PUBLICATIONS

J. Sjoberg et al., "Real-Time Transport Protocol (RTP) Payload Format and File Storage Format for the Adaptive Multi-Rate (AMR) and Adaptive Multi-rate Wideband (AMR-WB) Audio Codecs", Network Working Group, Request for Comments: 3267, Category: Standards Track, Jun. 2002, pp. 1-35.

L-A. Larzon et al., "The Lightweight User Datagram Protocol (UDP-Lite), RFC 3828 (rfc3828)", Network Working Group, Request for comments: 3828, Category: Standards Track, Jul. 2004, pp. 1-9.

G. Pelletier, "Robust Header Compression (ROHC): Profiles for User Datagram Protocol (UDP) Ute", RFC 4019 (rfc4019), Network Working Group, Request for Comments: 4019, Category: Standards Track, Apr. 2005, pp. 1-16.

C. Bormann et al., "Robust Header Compression (ROHC): Framework and four profiles: RTP, P, ESP, and uncompressed", Network working Group, Request for comments: 3095, Category: ndards Track, Jul. 2001, pp. 1-121.

Svanbro, "Lower Layer Guidelines for Robust RTP/UDPIIP Header Compression, RFC 3409", Internet Engineering Task Force (IETF), Dec. 2002, XP015009203 Section 2.2.

International Search Report and Written Opinion dated Jul. 8, 2008, issued in counterpart International Application No. PCT/US2007/025776.

International Search Report and Written Opinion of the International Authority dated Apr. 3, 2008, for counterpart International Application No. PCT/US2007/025552.

Jonsson et al., Robust Header Compression (ROHC): A Link-Layer Assisted Profile for IP/USP/RTP, Apr. 2002.

\* cited by examiner

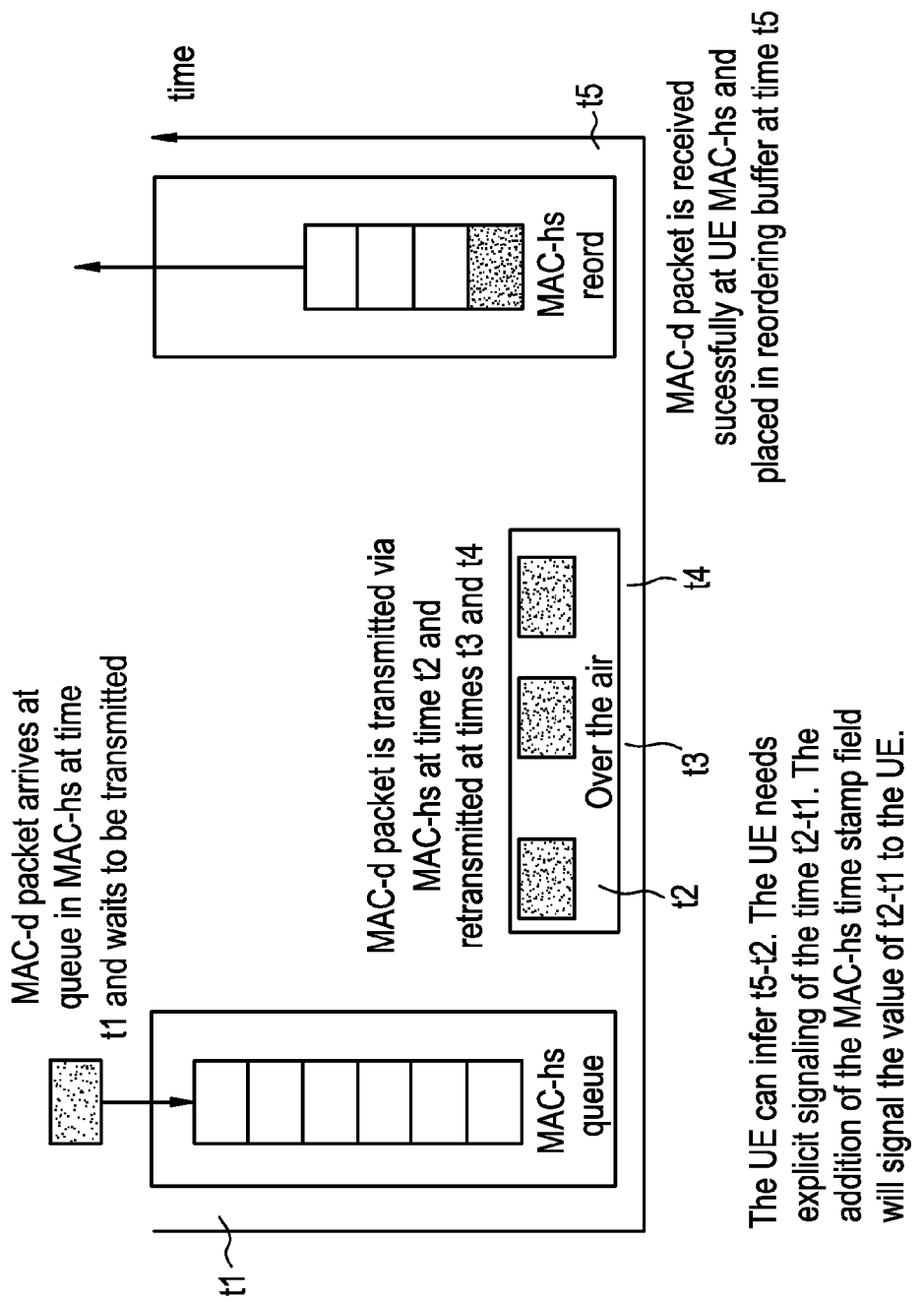

HEADER ELIMINATION FOR REAL TIME INTERNET APPLICATIONS

PRIORITY STATEMENT

This application is a continuation of U.S. patent application Ser. No. 11/212,113, filed on Aug. 26, 2005, the contents of which are incorporated by reference in its entirety.

BACKGROUND OF THE INVENTION

As the momentum for enabling voice over IP (VoIP) in 3G systems such as UMTS grows, operators will be concerned with maximizing the air interface capacity to maximize revenue. While VoIP simplifies core network design and adds new and valuable services compared to traditional circuit switch (CS) voice, VoIP also inherently adds additional overhead in the form of large headers.

FIG. 1 illustrates a well-known VoIP protocol stack for transmission in UMTS and the associated data at each layer in the stack. As shown, an AMR speech vocoder 10 encodes speech for transmission. For example, using an AMR 7.95 kbps vocoder, the vocoder delivers a 159 bit speech frame every 20 ms. To deliver this speech frame to an IP endpoint, the frame is encapsulated into a real-time transport protocol (RTP) packet at a RTP/RTCP layer 12, where RTCP refers to the radio transport control protocol. The RTP layer 12 adds 12 bytes of header to the speech frame, and the header conveys information such as sequence number, time stamp, synchronization source ID, extension bit, marker bit, etc. In addition, some padding is done for octet alignment.

Next, a user data protocol (UDP) and version 6 internet protocol (IPv6) layer 14 adds, according to UDP, another 8 bytes of header to indicate, for example, source/destination port numbers and a checksum (mandatory for IPv6); and then adds 40 bytes of header (e.g., routing information for each packet) according to IPv6.

Therefore the original 159 bit speech packet becomes 656 bits, which is an overhead of over 300%. Fortunately, it is not necessary to transmit the enormous header for each voice packet over the air interface all the time. 3GPP Release 5 mandates that the robust header compression (RoHC) specified in RFC 3095 be supported in the packet data convergence protocol (PDCP) layer 16 of UMTS. Namely, the PDCP layer 16 in the protocol stack for transmission will include a compressor 17 operating according to RoHC, while the PDCP layer in the protocol stack for reception will include a decompressor operating according to RoHC. As is known, the protocol stack for reception is opposite and complementary to the protocol stack for transmission, and is shown in FIG. 2.

The principle behind header compression is that most of the fields in the RTP/UDP/IPv6 header are static; hence they can be sent once uncompressed at call setup from the compressor on the transmission side to the decompressor at the reception side. Once the decompressor has reliably acquired the static information, the compressor starts sending compressed headers carrying information regarding the dynamic parts of the RTP/UDP/IPv6 header. From the compressed header the decompressor is able to fully reconstruct the RTP/UDP/IPv6 header and pass it on to the peer application. In this way, the large RTP/UDP/IPv6 headers are not transmitted over the UMTS air interface for each voice packet, leading to tremendous savings in capacity.

FIG. 3 illustrates the dynamic and static fields of the RTP, UDP, and IPv6 headers. The RTP, UDP and IPv6 protocols are well-known in the art as are the headers for these protocols and the fields comprising the headers. Accordingly, these protocols, headers and fields will not be described in detail. For RTP/UDP/IPv6, the compressed headers carry information regarding the sequence number, time stamp, marker bit M, and extension bit X fields in the RTP header, which are the dynamic RTP fields, and carry information regarding the UDP checksum, which is a dynamic field in the UDP header because it depends on the payload.

During, for example, uninterrupted speech, the dynamic information in the RTP header can be further compressed in most situations down to a one byte R-0 header. The R-0 header is a well-known compressed header profile set forth by RoHC, and includes a single byte of information. This single byte of information includes 2 bits for packet identification and the 6 least significant bits (LSB) of the RTP sequence number.

As stated above, unfortunately, the 2 byte UDP checksum is uncompressible and sent in every voice packet over the air. While slightly larger headers are sent sometimes to update certain header fields (e.g., time stamp, marker bit M and extension bit X), a majority of the time RoHC will operate with just 3 bytes of compressed header (1 byte R-0+2 bytes UDP checksum).

The output of the PDCP layer 16 is sent to the radio link control (RLC) layer 18. The RLC layer 18 may operate in a transparent mode or unacknowledged mode (UM). The unacknowledged mode is used in the packet switched (PS) domain of UMTS, and in this mode, an additional 1 byte of RLC UM header is added to the voice packet. This results in a total overhead of 4 bytes.

Subsequently, the medium access control (MAC)-d layer 20 performs transport format selection and routes the appropriate number of RLC packet data units (PDUs) from the RLC layer to the physical (PHY) layer 24. Unless logical channel multiplexing is used (not considered here), the MAC-d layer 20 does not add additional header overhead. In the case the high speed downlink packet access (HSDPA) channel is used in the downlink direction, packets flow from the MAC-d layer 20 to the MAC-hs layer 22, which performs user scheduling, rate selection, and hybrid automatic repeat request (HARQ). In case the enhanced dedicated channel (E-DCH) is used in the uplink direction, then packets flow from the MAC-d layer 20 to the MAC-e layer 22, which performs rate selection, multiple flow multiplexing, and HARQ. The MAC-hs/MAC-e layer 22 header size is variable, but typically adds approximately 20 bits of header when carrying a single MAC-d PDU. Finally, the physical (PHY) layer 24 adds its own error detection mechanism by attaching CRC bits, and transmits the data packet over the air.

Accordingly, as evident from the description above, even with RoHC, there is a significant penalty in overhead to pay when carrying voice over IP.

SUMMARY OF THE INVENTION

The present invention provides techniques to further reduce or compress the dynamic fields in a resulting RoHC header on the transmission side and decompress these fields, if desired, on the reception side.

In at least one embodiment, one or more of the dynamic fields in the RTP header that would remain after conventional RoHC are eliminated.

In at least other embodiments, the UDP checksum that would remain after conventional RoHC is eliminated.

In a further embodiment, both of these techniques are employed, which may results in removal of the RoHC header.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 7 illustrates a timing diagram showing the transfer of packets over the air-interface from the MAC-hs layer on the transmission side to the MAC-hs layer on the reception side.

DETAILED DESCRIPTION OF EXAMPLE EMBODIMENTS

Next, embodiments of the present invention will be described in detail. Initially, a conventional UMTS system will be described, followed by a discussion of compressing and decompressing the static fields in the RTP/UDP/IPv6 header. Then, compression and decompression of the extension bit X and marker bit M fields of the RTP header according to embodiments of the present invention will be explained. This is followed by description of compressing and decompressing the time stamp and sequence number fields of the RTP header according to embodiments of the present invention. Finally, methods of compressing and decompressing the UDP checksum portion of the UDP header will be described.

I. CONVENTIONAL UMTS SYSTEM

Figure 4:
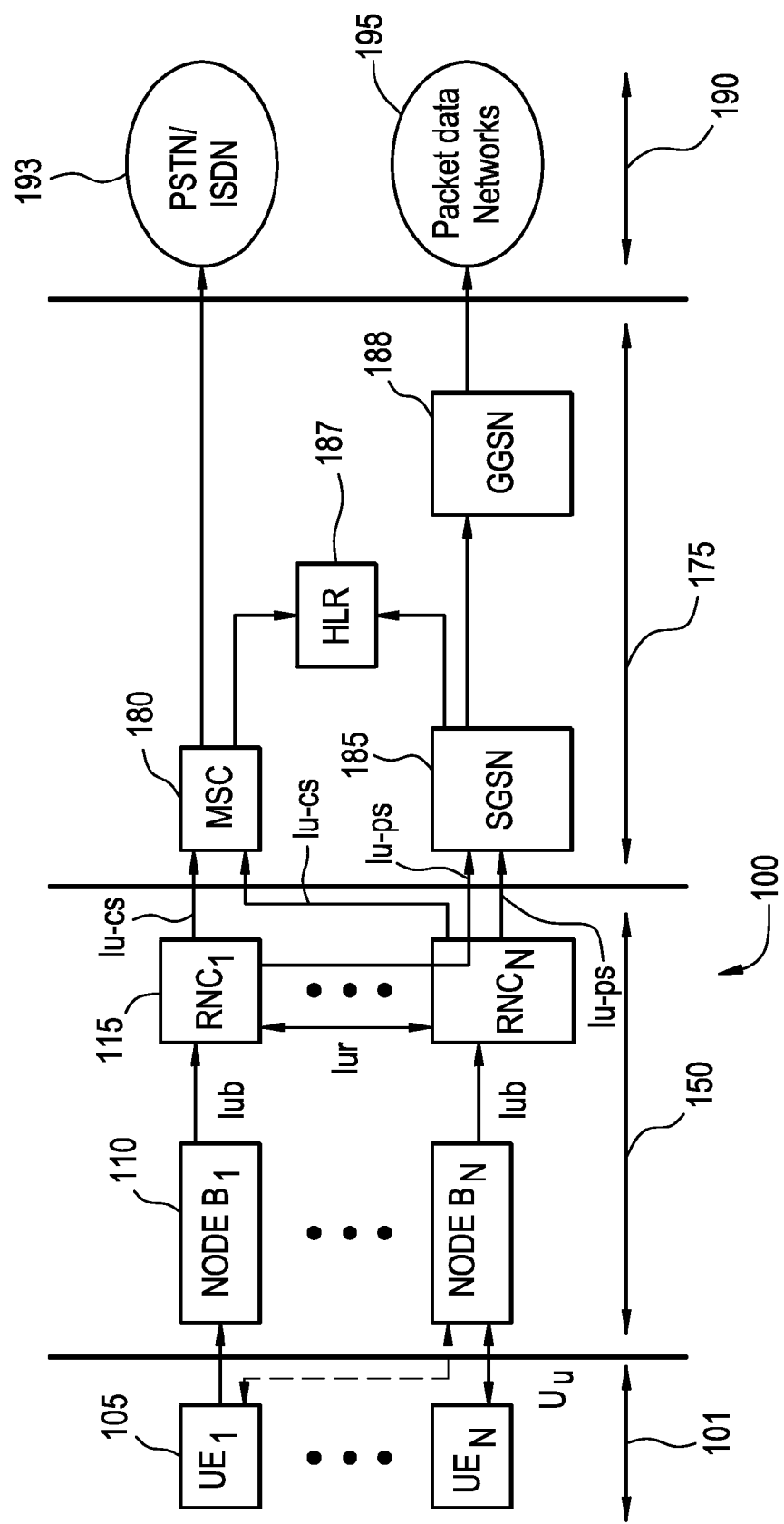
FIG. 4 illustrates a high-level diagram of an exemplary UMTS architecture, in accordance with an exemplary embodiment of the invention.

For the purposes of discussion, the methods according to the present invention will be described with respect to a UMTS system using the well-known protocols RTP/UDP/IPv6 as discussed above and the well-known session initiation protocol (SIP). As is known, SIP provides at least a messaging protocol to establish a packet data session, such as a packet data call. FIG. 4 illustrates a high-level diagram of an exemplary UMTS architecture, in accordance with an exemplary embodiment of the invention. Referring to FIG. 4, a UMTS architecture 100 comprises a radio access network part that may be referred to as a UMTS terrestrial radio access network (UTRAN) 150. The UTRAN, or more simply RAN, 150 interfaces over a Uu air interface with a radio interface part 101; namely user equipments (UEs) such as mobile stations. The Uu air interface is the radio interface between the RAN 150 and one or more UEs 105. The RAN 150 also interfaces with one or more core networks (CNs) 175 (only one being shown in FIG. 1 for simplicity) via interfaces Iu-cs and Iu-ps, for example. Iu-cs, short for Interface Unit (Circuit Switched) interface, is the interface in UMTS which links the RNC with a Mobile Switching Center (MSC). Iu-ps, short for Interface Unit (Packet Switched) interface, is the interface in UMTS which links the RNC with a Serving GPRS Support Node (SGSN). The Uu air interface enables interconnection of Node Bs with UEs, for example.

The CN 175 may include mobile switching centers (MSCs) 180, SGSNs 185 and Gateway GPRS serving/support nodes (GGSNs) 188. SGSN 185 and GGSN 188 are gateways to external networks 190. In general in UMTS, SGSNs and GGSNs exchange packets with mobile stations over the RAN, and also exchange packets with other internet protocol (IP) networks, referred to herein as "packet data networks". External networks 190 may include various circuit networks 193 such as a Public Switched Telephone Network (PSTN) or Integrated Service Digital Network (ISDN) and packet data networks 195, such as the internet. RAN 150 may also be linked to the CN 175 via back-haul facilities (not shown) such as T1/E1, STM-x, etc., for example.

The RAN 150 may include cell sites, called Node Bs 110, which may serve a group of UEs 105, generally using a Uu interface protocol. A Node B 110 may contain radio transceivers that communicate using Iub protocol with radio network controllers (RNCs) 115 in RAN 150. RNCs 115 within RAN 150 may communicate with each other using an Iur protocol, for example. The Iur interface is a subset of the Iu interface that enables interconnection of RNCs with each other. Several Node Bs 110 may interface with a single RNC 115 where, in additional to call setup and control activity, tasks such as radio resource management and frame selection in soft handoff may be carried out. Node Bs 110 and RNCs 115 may be connected via links that use ATM-based packet transport, for example.

Given the UMTS framework discussed above, it will be understood with respect to the following exemplary description that the UE performs header compression in the uplink direction, and either the GGSN, the SGSN, RNC or a combination thereof performs header decompression. In the downlink direction, the GGSN, the SGSN, the RNC or a combination thereof performs header compression, and the UE performs header decompression.

In both the uplink and downlink directions, the UE is an IP endpoint. As such, depending on the application at the UE receiving downlink communication, decompression at the UE may be optional. This is generally not the case with uplink communication because the destination IP endpoint is often connected to the wireless network via the internet.

II. COMPRESSING AND DECOMPRESSING THE STATIC FIELDS

As discussed above, in RoHC compression, the compressor and decompressor initially communicate the packet data uncompressed and determine the static fields of the RTP/UDP/IPv6 header. The compressor then removes the static fields, and the decompressor may reconstruct the static fields based on having previously recorded the static field information. It is currently specified in Rel'5 of UMTS that the PDCP layer which resides in the RNC will be responsible for the header compression/decompression. However, the methods according to the present invention may be employed regardless of whether these functionalities are performed by the RNC, SGSN, GGSN or a combination thereof. This will now be discussed in more detail below.

As will be appreciated, a call or session is initiated with a SIP INVITE request. The request includes a well-known set of set-up parameters such as the source IP address (e.g., the UE's IP address), the destination address (e.g., a SIP address for a subscriber), vocoder parameters, PDP context between the UE and GGSN, etc. The GGSN sends this INVITE to a SIP proxy server, which forwards the request to the destination. If acceptable to the destination, the destination responds with an OK message that, among other things, includes the destination IP address (e.g., the IP address for a VoIP phone of the subscriber).

As will be appreciated, neither the RNC nor the SGSN will become aware of, for example, the IP addresses communicated in these SIP messages. Accordingly, if the RNC or SGSN performs the compression and/or decompression functionality, the RNC or SGSN will need to acquire this information. This may be accomplished in several ways. For example, the RNC or SGSN may be programmed to open or look at the content of the SIP messages to obtain the information (e.g., IP addresses). As another example, this information may be signaled to the RNC or SGSN by the GGSN or, alternatively, by the UE.

Regardless of the methodology employed, the element or elements handling compression and decompression on the network side will obtain the static IP information so that this static information may be removed from the header or reconstructed in the header.

III. COMPRESSING AND DECOMPRESSING THE X-BIT AND M-BIT IN THE RTP HEADER—UPLINK AND DOWNLINK

As is known, the marker bit M and X bit provide information on the relationship of vocoder packet(s) carried by the RTP packet. For example, the marker bit is set to 1 if the first vocoder frame block in an RTP packet contains a speech frame that is the first in a talkspurt (continuous speech without a significant silence gap). For all other packets, the market bit is set to zero.

Figure 1:
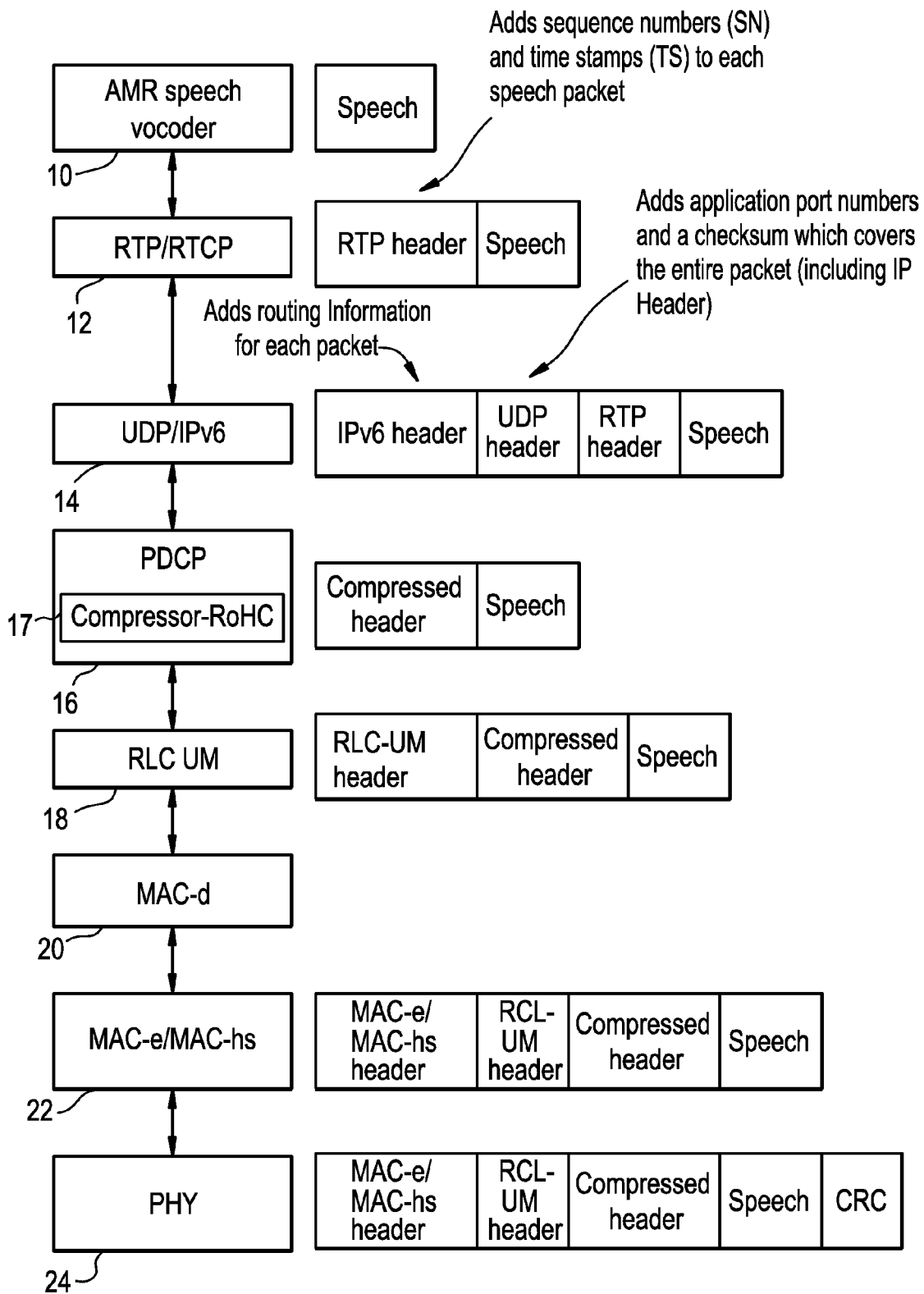
FIG. 1 illustrates a well-known VoIP protocol stack for transmission in a UMTS system and the associated data at each layer in the stack.

According to embodiments of the present invention, the transmission protocol stack, for example, the VoIP stack of FIG. 1 is modified such that number of vocoder packets per RTP is fixed, and this fixed relationship is known at both the compressor and decompressor. For example, according to one embodiment, a RTP profile having the fixed relationship of vocoder packets to RTP may be established. As such, the compressor and decompressor know the relationship prior to transmission and reception of RTP packets. According to another embodiment, this information may be signaled on a control channel. It will be appreciated that numerous other techniques for communicating the vocoder packet to RTP relationship will be readily apparent to those skilled in the art.

Given the above, the compressor may remove the marker bit M and the extension bit X from the RTP header. At the decompressor, the marker bit M and the extension bit X may be reconstructed based on the fixed number of vocoder packets to each RTP as known by the decompressor. For example, the decompressor may know that extension headers are not being used, in which case it sets the X bit to 0; or, it may be informed that header extensions are being used, in which case it sets the X bit to 1. As for the marker bit M, if the decompressor is informed that the marker bit is being set at the beginning of talk spurts, then based on the reconstructed time stamp it can set the M bit appropriately at the beginning of identified talk spurts.

Furthermore, it will be understood that while it is preferable to implement this decompression on the uplink, it may not be necessary to implement compression of the extension bit X and the marker bit M on the downlink.

IV. COMPRESSING AND DECOMPRESSING THE TIME STAMP AND SEQUENCE NUMBER IN THE RTP HEADER

This section discusses compression and decompression of the time stamp and sequence number in the RTP header according to embodiments of the present invention. As is known, the RTP time stamp corresponds to the sampling instant of the first sample encoded for the first frame-block in the packet, and therefore, provides relative timing among the generated RTP packets. The RTP sequence number is a number for identifying the order of a RTP packet in a sequence of RTP packets. Next, compression and decompression of the time stamp and sequence number in the RTP header will be described for the uplink, and then followed by a description for the downlink.

IV.A. Uplink

In UMTS there are two mechanisms for uplink transmission: a dedicated channel (DCH) or an enhanced dedicated channel (E-DCH).

IV.A.1. DCH

IV.A.1.a. DCH—Compression of Time Stamp and Sequence Number

In-sequence delivery of RTP packets on the uplink to the Node B and RNC (often collectively called the radio access network or RAN as discussed above) is guaranteed due to the existing structure of the uplink. The uplink DCH uses a fixed length transmission time interval (TTI) and provides a fixed transmission rate across the RAN that preserves both in-sequence delivery of the RTP payload and allows, according to embodiments of the present invention discussed below, keeping the relative time offsets of the generated RTP packets. Namely, the uplink DCH TTI may be modified according to embodiments of the present invention to have a fixed timing relationship with respect to RTP packet generation. For example, in one embodiment, the TTI may be chosen to match the period of RTP packet generation.

On the transmission side, the transmission protocol stack such as the VoIP stack of FIG. 1 is further modified so that the compressor 17 inspects the RTP time stamp and removes the RTP time stamp and sequence number from the RTP header. Then, the compressor 17 passes the inspected time stamp information to the physical layer 24, and the physical layer 24 is modified to transmit the RTP payloads at the same relative time offsets of the generated RTP packets as indicated by the time stamp information.

IV.A.1.b. DCH Decompression—Time Stamp

At the reception side, the RTP packets are received in-sequence. And because the RTP packets are sent at a fixed rate according to times dictated by their removed RTP time stamps, the decompressor may reconstruct the time stamps. For example, in the embodiment discussed above where the TTI equals the period for RTP packet generation, the time difference between arrival of a first packet and a subsequent second packet indicates the time difference represented by the time stamps removed from those packets. Because the initial packets were sent uncompressed, the decompressor learns the time stamps of those initial packets. Once the header compression begins removing the time stamps, the difference in arrival time between a currently received packet and the previously received packet as monitored at the receiver may be added to the time stamp of the previously received packet to reconstruct the time stamp of the currently received packet. The decompressor may then insert this determined time into the RTP header.

As will be appreciated, the present invention is not limited to setting the TTI equal to the period of RTP packet generation. Instead a different fixed timing relationship may exist. Namely, the TTI will equal some factor F times the period of RTP packet generation. Accordingly, the arrival time multiplied by the factor F will give the amount for adding to the previously determined (or known) time stamp to calculate the time stamp of the currently received packet. It will be appreciated that the factor F is 1 when the TTI equals the period of RTP packet generation.

IV. A.1.b.i. DCH Decompression—Sequence Number

First Embodiment

Because the RTP packets are received in sequence, the sequence number of the last uncompressed data packet is incremented each time a compressed packet is received to determine the sequence number for the received, compressed packet.

IV. A.1.b.ii. DCH Decompression—Sequence Number

Second Embodiment

Alternatively, referring to FIG. 1, the RLC layer 18 may operate in the UM mode and place sequence numbers in the RLC UM header to detect missing packets. In the uplink, packets are delivered to the compressor 17 in the UE in order. Accordingly, the RLC UM sequence numbers will set forth the same packet order as the RTP sequence numbers. Also, as discussed above, the protocol stack for reception is opposite and complementary to the protocol stack for transmission (See FIG. 2). Accordingly, for reception, the protocol stack is modified so that the RLC UM sequence number is delivered from the RLC layer to the PDCP layer, which includes the decompressor. The decompressor may then use the RLC UM sequence number to reconstruct the RTP sequence number. As discussed in detail above, packets are initially sent uncompressed. As such the decompressor learns the RLC UM sequence number and corresponding RTP sequence number, and may calculate the offset there between. Upon receiving the RLC UM sequence number in a compressed packet, the decompressor adds the offset to the RLC UM sequence number to obtain the RTP sequence number. The decompressor may then reconstruct the original RTP header, and the decompressor may continue with the RoHC decompression for the other headers (UDP/IPv6 headers).

Alternatively, given that the RTP sequence numbers are used to identify missing RTP packets, and hence it is the relative sequence numbers between packets that really matters and not the absolute sequence number, the RLC UM sequence number may be used directly for the purpose of generating an RTP sequence number to use in the reconstructed RTP header. For example, in one embodiment, an n-bit RTP sequence number may be reconstructed by using the n least significant bits of the RLC UM sequence number. As another example, no reconstruction takes place, and instead the RLC UM sequence numbers are supplied to the algorithm for detecting missing RTP packets or the algorithm for dealing with missing RTP packets (e.g., an algorithm that corrects for the missing RTP packets in some manner).

Also, it will be understood that physical layer errors may result in failed CRC events at the receiver. Thus, the entity performing header reconstruction (or decompression) may perform error concealment/recovery (e.g., AMR payload replication) as appropriate.

IV. A.2. E-DCH

First Embodiment

IV. A.2.a. E-DCH—Compression and Decompression of Time Stamp and Sequence Numbers For compression of the RTP time stamp and sequence number for transmission over the E-DCH, in a first embodiment, the transmission protocol stack such as the VoIP stack of FIG. 1 is modified so that the compressor 17 inspects the RTP time stamp and removes the RTP time stamp and sequence number from the RTP header. Then, the compressor 17 passes the inspected time stamp information to the physical layer 24, and the physical layer 24 is modified to transmit the RTP payloads at the same relative time offsets of the generated RTP packets as indicated by the time stamp information.

However, even if the RTP packets are transmitted in-sequence over the E-DCH and at time offsets corresponding to the removed time stamps as discussed in the DCH compression section above, the relative time offsets through the conventional RAN will not be preserved, although in-sequence delivery is guaranteed by E-DCH. As is known, the synchronous HARQ mechanism for E-DCH targets a maximum number of MAC-e PDU transmissions. Namely, a packet will be retransmitted a number of times, up to a maximum number, until the RAN acknowledges receipt of the packet. As is further known, according to synchronous HARQ, the initial transmission and retransmissions of a packet occur at a particular time slot referred to as a HARQ process slot. And, while one packet is being retransmitted, transmission and retransmission of a subsequent packet may take place in a different HARQ process slot. As is also known, a MAC-e PDU may be received successfully prior to the time corresponding to the maximum number of permitted transmissions, and when a MAC-e PDU is successfully received the MAC-e layer on the reception side passes the MAC-e PDU to a reordering buffer. The reordering buffer is used to put the MAC-e PDUs back in the proper sequence before delivery to the MAC-d layer. The E-DCH HARQ mechanism, however, does not provide a fixed transmission rate to allow keeping the relative time offsets of the generated RTP packets.

Consequently, in accordance with an embodiment of the present invention, the MAC-e layer in the reception side protocol stack is modified to transfer the MAC-d PDUs to the MAC-d layer only at fixed time intervals corresponding to the maximum number of targeted HARQ transmissions—regardless of the time at which the HARQ transmission actually terminates (e.g., is acknowledged). Namely, if the maximum number of retransmission is four, the MAC-e layer buffers a received MAC-d PDU for a time equal to transmitting the previous MAC-d PDU four times, and then transfers the MAC-d PDU to the MAC-d layer. This maintains the relative RTP timing offsets.

Because of the steps taken on the transmission side and reception side to maintain the relative timing offsets of the RTP packets, decompression of the RTP time stamp and sequence number for E-DCH transmissions may take place in the same manner as discussed above with respect to DCH transmissions.

IV.A.3. E-DCH

Second Embodiment

IV.A.3.a. E-DCH—Compression of Time Stamp and Sequence Numbers

In a this second embodiment, the transmission protocol stack such as the VoIP stack of FIG. 1 is modified so that the compressor 17 inspects the RTP time stamp and removes the RTP time stamp and sequence number from the RTP header. Then, the compressor 17 passes the inspected time stamp information to the physical layer 24, and the physical layer 24 is modified to transmit the RTP payloads at the same relative time offsets of the generated RTP packets as indicated by the time stamp information. Furthermore, in this embodiment, the RLC layer 18 operates in the UM mode such that RLC UM sequence numbers are inserted into RLC header.

IV.A.3.b. E-DCH—Decompression of Time Stamp and Sequence Number

Figure 2:
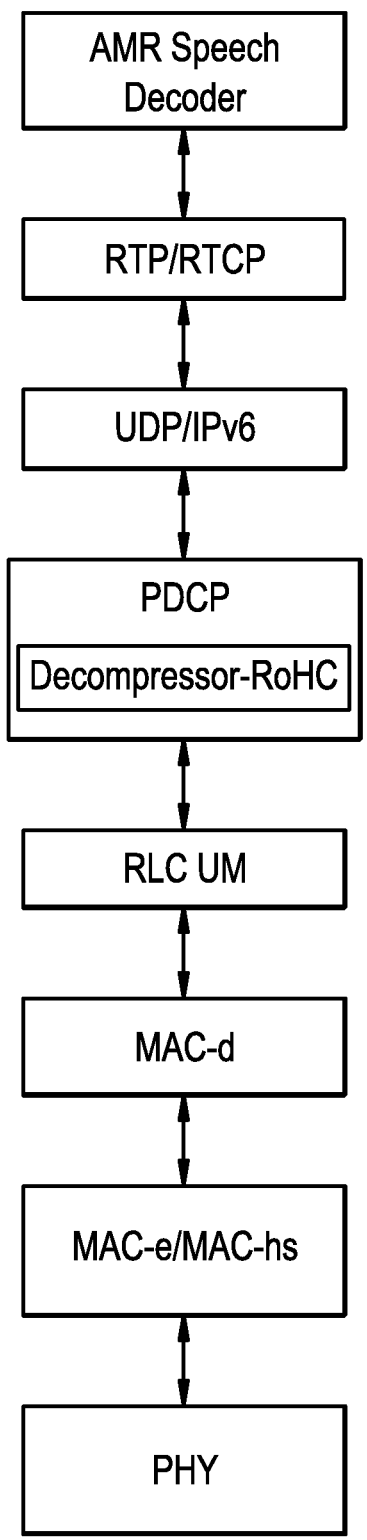
FIG. 2 illustrates a well-known VoIP protocol stack for reception in a UMTS system.
Figure 5:
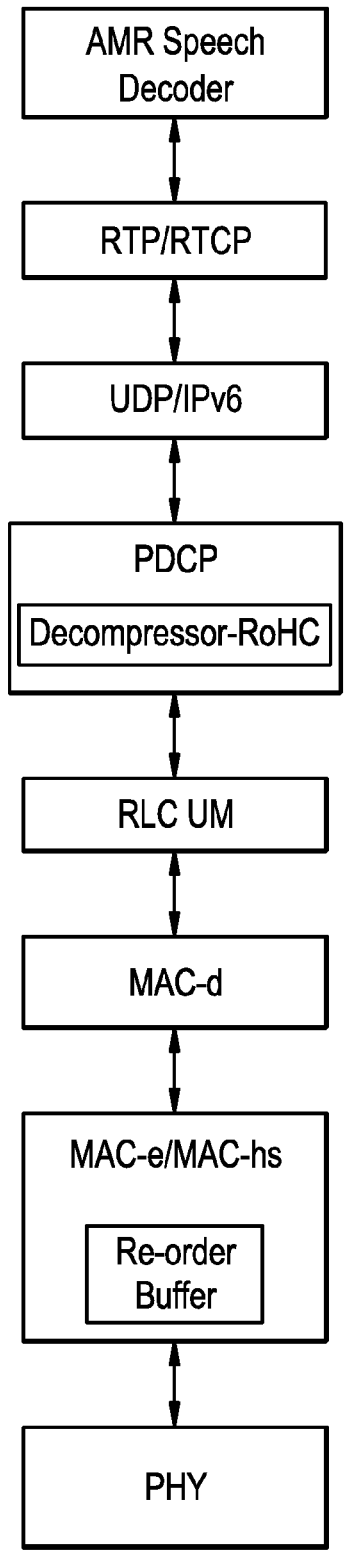
FIG. 5 illustrates a reception side VoIP protocol stack of FIG. 1 modified according to an embodiment of the present invention.

In this embodiment, the reception side protocol stack, such as the reception side VoIP stack shown in FIG. 2, is modified to include a reordering buffer. For example, the MAC-e layer may be modified to include the reordering buffer as shown in FIG. 5. In this embodiment, the reordering buffer stores the received MAC-e PDUs, and outputs the MAC-e PDUs in order based on the RLC UM sequence numbers. Furthermore, the MAC-e layer records the arrival times of the MAC-e PDUs, and outputs the MAC-e PDUs at time offsets corresponding to the arrival time differences.

As discussed above, packets are transmitted according to the fixed HARQ timing framework, and are transmitted at the same relative time offsets of the generated RTP packets as indicated by the time stamp information. As such the time difference between the arrival of a first packet and a subsequent second packet indicates the time offset between the RTP time stamps removed from the first and second packets. Because the initial packets were sent uncompressed, the decompressor learns the time stamps of those initial packets. Once the header compression begins removing the RTP time stamps, the difference in arrival time between a currently received packet and the previously received packet may be added to the time stamp of the previously received packet, to reconstruct the time stamp of the currently received packet. The decompressor may then insert this determined time into the RTP header.

With respect to decompressing the RTP sequence number, this may take place according to either of the embodiments discussed above with respect to decompression of the RTP sequence number for DCH transmissions.

In an alternative embodiment, the reordering buffer may instead reside in a different layer, such as the RTP layer. As will be understood, the decompression of the time stamps then takes place at the RTP layer instead of at the decompressor.

IV. B. Downlink

Figure 6:
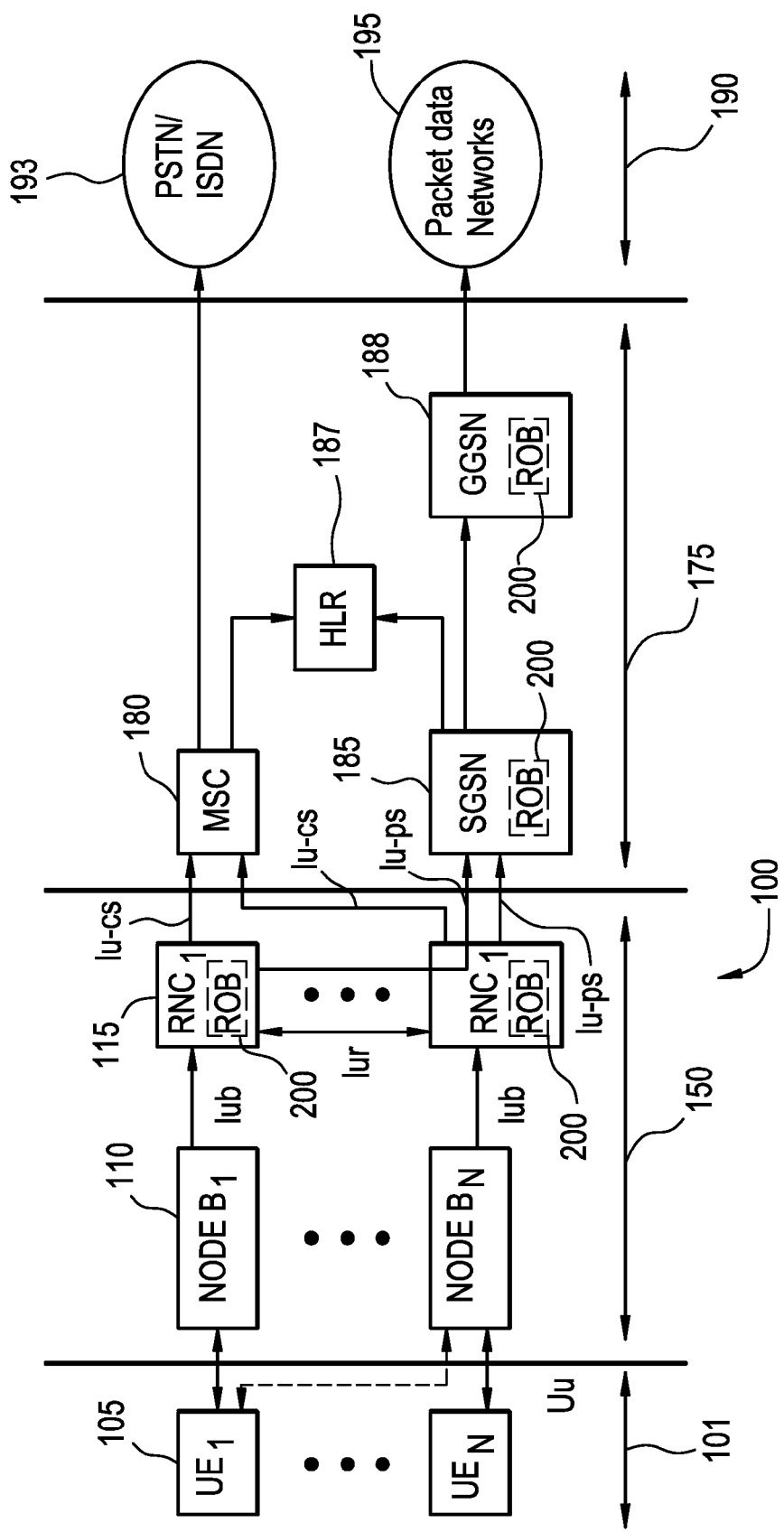
FIG. 6 illustrates possible locations of a reordering buffer in the conventional UMTS system of FIG. 4 according to embodiments of the present invention.

The in-sequence delivery of a RTP packet to the RAN is not guaranteed in the downlink. Therefore, according to embodiments of the present invention, at least one of the GGSN 188, the SGSN 185, or the RNC 115 may by modified to include a reordering buffer 200 as shown in FIG. 6. Namely, FIG. 6 illustrates the conventional UMTS system such as shown in FIG. 4, but further illustrates by dashed boxes that one of the GGSN 188, SGSN 185 and/or RNC 115 may include a reordering buffer 200.

The reordering buffer 200 stores the packets received by the wireless network from, for example, the packet data network 195, and outputs the packets in order of their RTP sequence numbers. This results in in-sequence delivery at the RAN.

As will be appreciated, situations may arise where an RTP packet is missing. To prevent the reordering buffering 200 from blocking the packet flow and overflowing because of a missing RTP packet, the present invention provides a corrective measure. In one embodiment, after the packet has been missing for a set time (e.g., set as a design parameter by the system designer), the entity (e.g., GGSN, SGSN or RNC) with the reordering buffer 200 replicates the previous RTP packet and sets the RTP sequence number of the duplicated packet to match the sequence number of the missing packet.

In an alternative embodiment, after the set time, the entity with the reordering buffer 200 creates an RTP packet with no payload and sets the RTP sequence number of this created RTP packet to match the sequence number of the missing packet. In yet another embodiment, the missing packet is omitted. Namely, after the set time where the missing packet has not been received, the reordering buffer 200 skips that missing packet and continues outputting packets in order of their RTP sequence number. This embodiment relies on the UE performing header reconstruction to decide the best method of error concealment.

In UMTS there are two mechanisms for downlink transmission: a dedicated channel (DCH) or a high-speed downlink shared channel (HS-DSCH).

IV. B.1. DCH—Compression and Decompression

By using the reordering buffer described above, in-sequence delivery of RTP packets at the RAN is guaranteed. Accordingly, compression at the wireless network and decompression at the UE may take place in the same manner as described above with respect to uplink compression and decompression for the DCH, albeit compression takes place on the network side and not the UE and decompression takes place at the UE and not the network side.

Also, it will be understood that physical layer errors may result in failed CRC events at the receiver. Thus, the entity performing header reconstruction (or decompression) may perform error concealment/recovery (e.g., AMR payload replication) as appropriate.

IV. B.2. HS-DSCH—Compression and Decompression

For the HS-DSCH, the transmission time of packets over the air-interface is variable. Therefore, while the HS-DSCH does guarantee in-sequence delivery of packets by design, the HS-DSCH does not provide an indication of a timing relationship between the packets, such as the relative timing offsets of the RTP packets. For the purposes of explanation, this timing situation will be described for the conventional VoIP protocol stacks illustrated in FIGS. 1 and 2 with reference to the timing diagram in FIG. 7.

FIG. 7 illustrates a timing diagram showing the transfer of packets over the air-interface from the MAC-hs layer on the transmission side to the MAC-hs layer on the reception side. As shown, a MAC-d packet from the MAC-d layer 20 on the transmission side are received by the MAC-hs layer 22 and stored in a MAC-hs queue at time t1. At a time t2, the physical layer 24 sends the packet over the air. On the reception side, the packet is received and stored in the MAC-hs queue of the MAC-hs layer on the reception side at time t5.

As is well-known, the receiver can deduce the over-the-air time t5-t2. However, the waiting time t2-t1 in the MAC-hs queue on the transmission side is variable and unknown to the receiver. Thus, the relative time offsets of the generated RTP packets cannot be deduced at the reception side.

In an embodiment of the present invention, the MAC-hs layer 22 is modified to include a time stamp field in the MAC-hs header. This time stamp field will indicate the time a MAC-d PDU was waiting in the MAC-hs queue. Accordingly, on the transmission side, the compressor 17 inspects the time stamp in the RTP header, sends this information to the MAC-d layer 20, and removes the time stamp and sequence number fields. The MAC-d layer 20 outputs the packets to the MAC-hs layer 22 based on the relative timings indicated by the time stamps received from the compressor 17. This way, the MAC-d packets arrive at the MAC-hs queue of the MAC-hs layer 22 at the same relative timings indicated by the RTP header time stamp fields. Then, as described above, the MAC-hs layer 22 adds a time stamp field to the MAC-hs header indicating the time the MAC-d packet resided in the MAC-hs queue prior to transmission.

On the reception side, the receiver deduces the over-the-air trip time t5-t2 in the well-known manner, and determines the time t2-t1 from the MAC-hs header. These determined times and the arrival time of the packet are then sent to the decompressor. The decompressor subtracts the determined times t5-t2 and t2-t1 from the arrival time to determine a base time Tb. The base time Tb represents the time the MAC-d PDU arrived at the MAC-hs queue on the transmission side as determined by the decompressor. When the uncompressed packets are initially sent, the decompressor determines an offset Toff equal to the base time Tb minus the time stamp in the RTP header. Accordingly, when a compressed packet is received, the base time Tb for that packet is determined, and then the Toff value is added thereto to determine the RTP time stamp for the packet. The decompressor then reconstructs the RTP header using this determined RTP time stamp.

The compression and decompression of the RTP sequence number may take place in the same manner as described above with respect to compression and decompression of the RTP sequence number in the uplink for the DCH.

However, for the HS-DSCH, the RLC layer 18 on the transmission side may be operated in the transparent mode TM. When the RLC layer 18 operates in TM, the compression and decompression of the RTP sequence number takes place as described with respect to the first embodiment of compressing and decompressing the sequence number for the uplink DCH.

Furthermore, HSDPA allows the Node B to discard MAC-d PDUs, but indication of discarded MAC-d PDUs is not given to the UE. Therefore, according to an embodiment of the present invention, the MAC-hs header is further modified to include a discarded packets field. Namely, the MAC-hs layer is modified to add a discarded packet field in the MAC-hs header indicating the number of discarded MAC-d PDUs since the last transmitted MAC-d PDU. The UE will then be able to infer discarded packets versus gaps in the data stream.

Also, it will be understood that physical layer errors may result in failed CRC events at the receiver. Thus, the entity performing header reconstruction (or decompression) may perform error concealment/recovery (e.g., AMR payload replication) as appropriate.

V. COMPRESSING AND DECOMPRESSING THE UDP CHECKSUM

Figure 3:
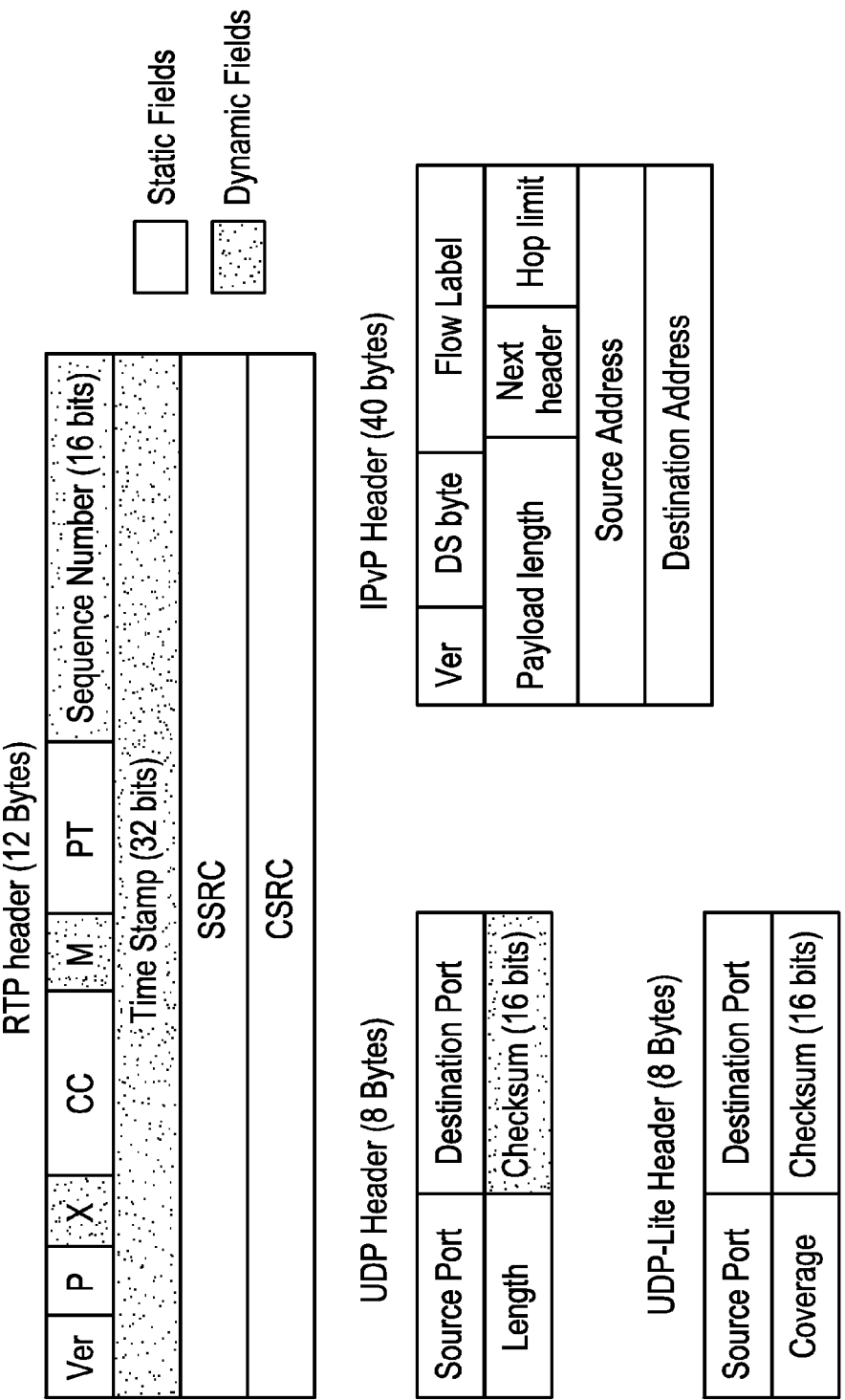
FIG. 3 illustrates the dynamic and static fields of the RTP, UDP, and IPv6 headers.

The UDP checksum is mandatory with IPv6, hence there is no option to disable the UDP checksum (as is possible in IPv4). The IETF has recognized that certain applications (such as voice and real-time video) can benefit by having damaged data delivered rather than having the packets discarded by the network. Hence, the IETF has introduced UDP-Lite, which provides a partial checksum for the UDP payload that allows only a specific portion of the payload, such as the UDP-Lite and IP headers, to be checked for errors. The UDP-Lite header is well-known and illustrated in FIG. 3.

The advantage in having only the UDP-Lite and IP header covered by the checksum is that these fields are static as far as RoHC is concerned, and therefore, the UDP-Lite checksum is also static. Accordingly, these headers are initially sent uncompressed to the decompressor, and thereafter, the need to send the UDP checksum with every voice packet is eliminated. The IETF RFC 4019 defines the RoHC profile for UDP-Lite. For VoIP, it is not expected that the coverage field of the UDP-Lite header would change during the session, hence the entire UDP-Lite header becomes static and fully compressible.

Unfortunately, not all applications would necessarily choose to use UDP-Lite, nor is it guaranteed that UDP-Lite is available as a transport mechanism. In those cases, regular UDP may be used and the UDP checksum would not be static; forcing the transmission of the UDP checksum over the air interface with every voice packet. For this situation, two embodiments will be described below that avoid having to send the UDP checksum over the air interface.

VI. A. First Embodiment

IV. A.1. Compression

According to this embodiment, on the transmission side, the compressor 17 may be modified to strip off the UDP checksum, and the data packet is sent without the UDP checksum. In another variation of this embodiment, the RoHC compressor 17 may be modified to first verify the checksum to make sure that the checksum does not fail before sending the packet. If the checksum fails the packet is dropped at the compressor 17. However, if the checksum is verified, then the checksum may be stripped off during compression.

IV.A.2. Decompression

At the reception side, the decompressor may be modified to re-compute the checksum. The checksum is generated as specified in the UDP. Namely, the RoHC decompressor mimics the UDP layer and re-computes the checksum based on the received packet. The computed checksum is then inserted into the UDP header to fully reconstruct the UDP header.

Both the compression and decompression methodologies discussed above may be employed for the uplink and the downlink.

V. B. Second Embodiment

A second embodiment of the present invention enforces the use of UDP-Lite to avoid sending the UDP checksum over the air interface.

V. B.1. Compression

In this embodiment, the compressor 17 in the PDCP layer 16 may be modified to convert regular UDP to UDP-Lite. To convert UDP to UDP-Lite, the compressor 17 overwrites the 2-byte length field in the UDP header to form the 2-byte coverage field in UDP-Lite, changes the IP identifier in the IPv6 header to a value of indicating UDP-Lite (e.g., 136 in IPv6), re-computes a checksum based on a desired coverage, and replaces the UDP checksum with the re-computed checksum. The 2-byte length field in regular UDP now becomes a 2-byte coverage field for the checksum in UDP-Lite, and the RoHC compressor can specify that the coverage of the checksum is only the UDP-Lite and IP headers. As the checksum is now a static value (does not depend on dynamic information), it no longer needs to be sent over the air interface with every voice packet. Namely, the RoHC will eliminate the checksum along with the rest of the UDP-Lite header.

V. B.2. Decompression

At the reception side, if the application that will receive the packet (e.g., the peer application) supports UDP-Lite, then the decompressor may operate in the conventional manner. However, if the application that will receive the packet only supports UDP, then the decompressor may operate in a modified manner and convert UDP-Lite to UDP. Namely, the decompressor changes the IP identifier in the IPv6 header to indicate UDP, re-computes the UDP checksum to cover the entire packet, replaces the UDP-Lite checksum with the UDP checksum, and overwrites the 2-byte coverage field with the 2-byte length information required for the UDP header.

The compression and decompression methods may be employed on the uplink and the downlink. However, in another embodiment, support for UDP-Lite may be made mandatory in the UE (e.g., mobile phone, PDA, computer, etc.). Since the UE supports UDP-Lite from requirement, when transmitting, no conversion to UDP-Lite is required. And, when receiving, no conversion to UDP from UDP-Lite is required. Namely, the UE will be able to operate properly, not ever knowing that the original application was using regular UDP and not UDP-Lite.

VI. CONCLUSION

As will be appreciated, the compression and decompression methods for eliminating the RTP header and the UDP checksum may be employed together such that together with conventional RoHC, the RTP/UDP/IPv6 header is completely eliminated. This reduction in overhead can be used to allow for greater, for example, VoIP capacity over the UMTS air interface.

The invention being thus described, it will be obvious that the same may be varied in many ways. For example, while the present invention was described with respect to VoIP and a UMTS system, it will be understood that the present invention is not limited to VoIP, UMTS or even to wireless applications. Such variations are not to be regarded as a departure from the invention, and all such modifications are intended to be included within the scope of the invention.

We claim:

1. A method of decompressing a header, comprising:
monitoring arrival times of packets at a receiver, the packets not including a real-time transport protocol (RTP) time stamp in a RTP header portion of the packets, and the packets including a medium access control-high speed (MAC-hs) time stamp in a MAC-hs header portion of the packets;
determining the RTP time stamp of a currently received packet based on (i) a difference between the arrival time of the currently received packet and the arrival time of a previously received packet, and (ii) the MAC-hs time stamp in the MAC-hs header portion; and
decompressing the RTP header portion of the currently received packet by inserting the determined RTP time stamp into the RTP header portion, and the decompressing includes reconstructing a RTP sequence number for the RTP header portion of the currently received packet based on (i) a received radio link control (RLC) unacknowledged mode (UM) sequence number associated with the currently received packet or (ii) a RTP sequence number for the previously received packet plus an increment.

2. The method of claim 1, wherein the determining determines the RTP time stamp based on the difference and the RTP time stamp for the previously received packet.

3. The method of claim 2, wherein the determining includes adding a product of the difference and a factor to the RTP time stamp determined for the previously received packet.

4. The method of claim 3, wherein the factor equals the transmission time interval for a channel over which the packets are received divided by a period of RTP packet generation.

5. The method of claim 1, wherein the determining determines the RTP time stamp based the arrival time of the currently received packet, the arrival time of the previously received packet, and the RTP time stamp for the previously received packet.

6. The method of claim 1, further comprising:
generating a user data protocol (UDP) checksum for the currently received packet; and
inserting the generated UDP checksum into a UDP header portion of the currently received packet.

7. The method of claim 1, further comprising:
converting a user data protocol-Lite (UDP-Lite) portion of the currently received packet to UDP; and
decompressing the currently received packet according to robust header compression (RoHC).

8. A method of compressing a header, comprising:
forming real-time transport protocol (RTP) packets such that each of the RTP packets include a same fixed number of vocoder packets; and
compressing a header portion of each of the RTP packets by removing an extension bit and a marker bit from the header portion, the fixed number of vocoder packets being used during decompression such that another extension bit and another marker bit established based on the fixed number of vocoder packets are inserted into the compressed header portion when decompressed.

9. A receiver configured to,
monitor arrival times of packets at the receiver, the packets not including a real-time transport protocol (RTP) time stamp in a RTP header portion of the packets, and the packets including a medium access control-high speed (MAC-hs) time stamp in a MAC-hs header portion of the packets;
determine the RTP time stamp of a currently received packet based on (i) a difference between the arrival time of the currently received packet and the arrival time of a previously received packet, and (ii) the MAC-hs time stamp in the MAC-hs header portion; and
decompress the RTP header portion of the currently received packet by inserting the determined RTP time stamp into the RTP header portion, and the decompressing includes reconstructing a RTP sequence number for the RTP header portion of the currently received packet based on (i) a received radio link control (RLC) unacknowledged mode (UM) sequence number associated with the currently received packet or (ii) a RTP sequence number for the previously received packet plus an increment.

10. The receiver of claim 9, wherein the receiver is configured to determine the RTP time stamp based on the difference and the RTP time stamp for the previously received packet.

11. The receiver of claim 10, wherein the receiver is configured to add a product of the difference and a factor to the RTP time stamp determined for the previously received packet in determining the RTP time stamp of a currently received packet.

12. The receiver of claim 11, wherein the factor equals the transmission time interval for a channel over which the packets are received divided by a period of RTP packet generation.

13. The receiver of claim 9, wherein the receiver is configured to determine the RTP time stamp based the arrival time of the currently received packet, the arrival time of the previously received packet, and the RTP time stamp for the previously received packet.

14. The receiver of claim 9, wherein the receiver is configured to, generate a user data protocol (UDP) checksum for the currently received packet; and insert the generated UDP checksum into a UDP header portion of the currently received packet.

15. The receiver of claim 9, wherein the receiver is configured to, convert a user data protocol-Lite (UDP-Lite) portion of the currently received packet to UDP; and decompress the currently received packet according to robust header compression (RoHC).

16. A transmitter configured to, form real-time transport protocol (RTP) packets such that each of the RTP packets include a same fixed number of vocoder packets; and compress a header portion of each of the RTP packets by removing an extension bit and a marker bit from the header portion, the fixed number of vocoder packets being used during decompression such that another extension bit and another marker bit established based on the fixed number of vocoder packets are inserted into the compressed header portion when decompressed.

* * * * *